(12) United States Patent
Togino

(10) Patent No.: US 7,554,598 B2
(45) Date of Patent: Jun. 30, 2009

(54) IMAGING SYSTEM, AND IDENTITY AUTHENTICATION SYSTEM INCORPORATING THE SAME

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 715 days.

(21) Appl. No.: 10/809,423

(22) Filed: Mar. 26, 2004

(65) Prior Publication Data

US 2004/0202354 A1  Oct. 14, 2004

(30) Foreign Application Priority Data

Apr. 10, 2003  (JP) .............................. 2003-106809

(51) Int. Cl.
*H04N 5/225* (2006.01)
(52) U.S. Cl. ..................... 348/340; 348/294; 348/370
(58) Field of Classification Search ................ 348/370, 348/371, 262, 260, 340, 294
See application file for complete search history.

(56) References Cited

U.S. PATENT DOCUMENTS

| 5,751,836 | A * | 5/1998 | Wildes et al. ............... 382/117 |
| 5,886,780 | A * | 3/1999 | Fukuma et al. ............. 356/128 |
| 6,532,298 | B1 * | 3/2003 | Cambier et al. ............ 382/117 |
| 6,556,349 | B2 * | 4/2003 | Cox et al. ................... 359/626 |
| 6,591,001 | B1 * | 7/2003 | Oda et al. ................... 382/117 |
| 7,176,973 | B2 * | 2/2007 | Takada et al. ............... 348/335 |
| 2001/0026322 | A1 * | 10/2001 | Takahashi et al. .......... 348/340 |

FOREIGN PATENT DOCUMENTS

| JP | 59-50042 | 6/1984 |
| JP | 05-100186 | 4/1993 |
| JP | 07-213511 | 8/1995 |
| JP | 11-215119 | 8/1999 |

* cited by examiner

*Primary Examiner*—Lin Ye
*Assistant Examiner*—Gevell Selby
(74) *Attorney, Agent, or Firm*—Kenyon & Kenyon LLP

(57) ABSTRACT

The invention relates to an imaging system 50 wherein, without recourse to any large-size pupil relay optical system, a plurality of minute imaging optical systems are arranged in rows and columns to pick up pixel images of a divided fundus through separate imaging optical systems, so that a fundus image is synthesized from the thus picked up pixel images as well as an identity authentication system. A plurality of imaging units $10_1$, $10_1$ and $10_3$ comprising imaging lenses $1_1$, $1_2$ and $1_3$ and imaging devices $3_1$, $3_2$ and $3_3$ located on their image planes are two-dimensionally arranged in rows and columns. An illumination device for illumination 4 of a subject E in a direction along the optical system of each imaging unit is provided, wherein each of the optical axes $2_1$, $2_2$ and $2_3$ of the respective imaging units is defined by an axis that passes through a common object point P at an imaging position and the center of each imaging lens.

14 Claims, 13 Drawing Sheets

FIG. 3(a)
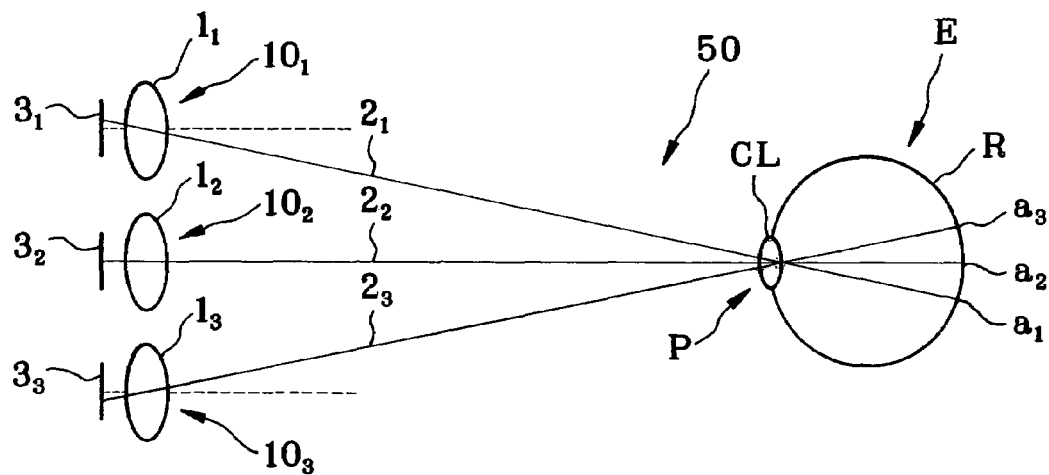
FIG. 3(b)
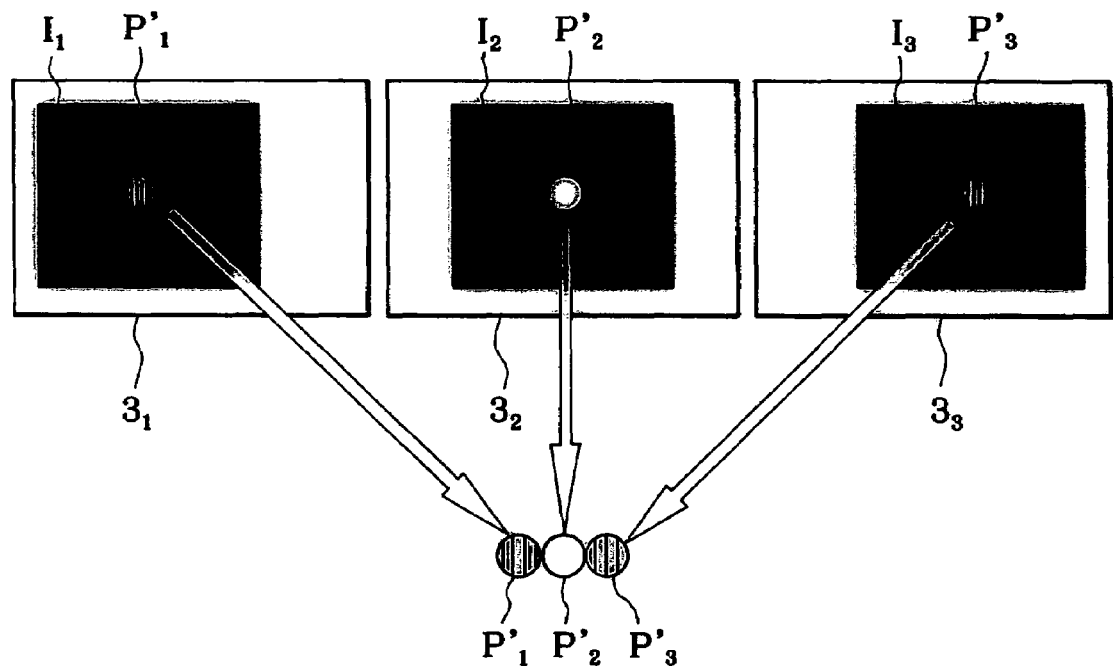
FIG. 3(c)

IMAGING SYSTEM, AND IDENTITY AUTHENTICATION SYSTEM INCORPORATING THE SAME

This application claims benefit of Japanese Application No. 2003-106809 filed in Japan on Apr. 10, 2003, the contents of which are incorporated by this reference.

BACKGROUND OF THE INVENTION

The present invention relates generally to an imaging system and an identity authentication system, and more particularly to an imaging system for imaging the state of the fundus of the eye in a divided fashion and an identity authentication system incorporating the same.

So far, there has been known an identity authentication system wherein a fundus camera is used for imaging the state (retinal blood vessel pattern) of the fundus of the eye for the purpose of identity authentication.

FIG. 15 is illustrative of the construction of an optical system used with such an imaging system. In that optical system, a relay optical system 100 is located in front of an eyeball E the image of which is to be picked up. This relay optical system 100 projects an image of a pupil P of the eyeball E onto an entrance pupil 102 of an imaging lens 101. An image of the retina R projected through the crystalline lens LC of the eyeball E at a distance is projected through the relay optical system 100 as a real image in front of the imaging lens 101. In turn, this real image is projected through the imaging lens 101 so that it is formed as a fundus image on an imaging device 103. Trait data is extracted from the fundus image formed by the imaging device 103 for identity authentication or identification.

To pick up images over a wide range of the retina R through a small pupil P, the prior art must use a large lens system as the relay optical system 100. To reduce pupil aberrations, it is also required to use an aspheric surface or a cemented lens in the relay optical system 100.

With an identity authentication system, the head of a person must be positioned at a constant spacing with respect to a fundus camera and in a predetermined direction.

SUMMARY OF THE INVENTION

The present invention provides an imaging system, characterized by comprising a plurality of imaging units, each of which comprises an imaging lens and an imaging device located on the image plane thereof and which are two-dimensionally arranged in rows and columns, and an illumination device for illuminating a subject in a direction along the optical axis of each imaging unit, wherein the optical axis of each imaging unit is defined by an axis that passes through a common object point at an imaging position and the center of each imaging lens.

The present invention also provides an identity authentication system, characterized by comprising such an imaging system as recited above, wherein said each imaging unit simultaneously picks up images inclusive of an image of the pupil of the individual to be authenticated, which is located at an object point position, a fundus image synthesis block wherein the image of the pupil of the individual to be authenticated is cut out of each of the images picked up by said imaging system, and the thus cut-out images of the pupil are used as pixels to rearrange said pixels corresponding to an arrangement of said imaging units, thereby synthesizing a fundus image, a data generation block that extracts, from the thus synthesized fundus image, data indicative of traits thereof, and an identification block that compares the thus extracted data with separately stored data.

In accordance with the invention, a plurality of imaging units, each of which comprises an imaging lens and an imaging device located in the image plane thereof, are two-dimensionally arranged in rows and columns, and an illumination device for illuminating a subject in a direction along the optical axis of each imaging unit are provided, wherein the optical axis of each imaging unit is defined by an axis that passes through a common object point at an imaging position and the center of each imaging lens. Thus, the invention can provide a slim imaging system that can synthesize the desired fundus image at low cost without recourse to any large-size pupil relay optical system. With this imaging system, the trait data of the fundus image necessary for authentication can be easily extracted with no need of particularly strict alignment of the head of the individual to be authenticated with respect to that imaging system.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 3(a), 3(b) and 3(c) are illustrative of how a fundus image is synthesized from images obtained through the imaging system; FIG. 3(a) is similar to FIG. 1, FIG. 3(b) is illustrative of an image formed through each imaging unit, and FIG. 3(c) is illustrative of how the fundus image is synthesized by combining the cut-out images together.

FIG. 14(a) is illustrative of one modification wherein the imaging units are arranged in a crosswise pattern, and FIG. 14(b) is illustrative of another modification wherein the imaging unit are arranged at a center area as well as at a concentric area.

DESCRIPTION OF THE PREFERRED EMBODIMENTS

The principles and embodiments of the imaging system of the invention as well as the identity authentication incorporating it will now be explained with reference to the accompanying drawings.

Figure 4:
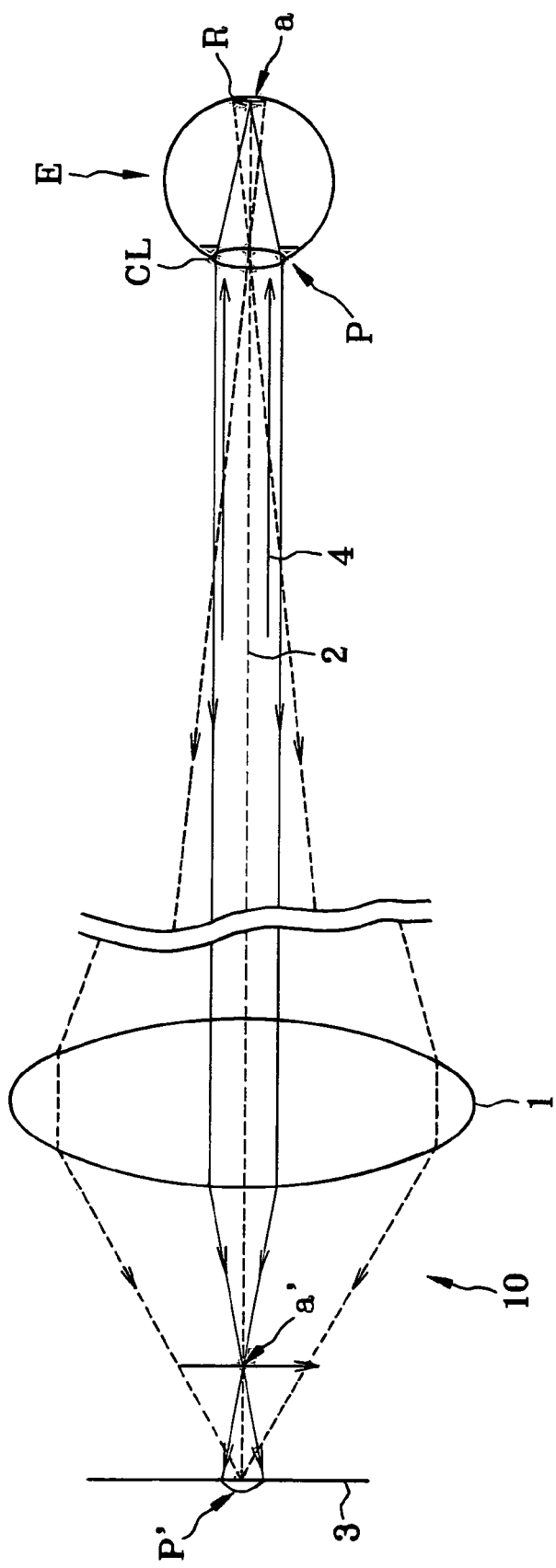
FIG. 4 is illustrative of the principles of the imaging system according to the invention.

FIG. 4 is illustrative of the principles of the imaging system according to the invention. In the imaging system of the invention, an imaging unit 10 is used as a constituting unit. A number of such imaging units 10 are two-dimensionally arranged in rows and columns. The imaging unit 10 is made up of an imaging lens 1 and an imaging device 3 located at its image plane.

The imaging unit 10 is provided, or used in combination, with an illumination device. This illumination device directs illumination light 4 along an optical axis 2 to the eyeball E of the subject to be imaged. The illumination device will be described in detail. It is here understood that the optical axis of the imaging lens 1 is defined by the above optical axis 2. In this case, the optical axis 2 is given by a straight line that passes through the center of the imaging lens 1 and the center of the pupil P of the eyeball E.

As a matter of course, such an imaging unit 10 is well corrected for aberrations at a position conjugate to an imaging device 3. At that conjugate position, the pupil P of the eyeball E of a viewer is located when the viewer stands at a predetermined position. As the pupil P of the viewer is in alignment with that conjugate position, the imaging lens 1 is in focus with the pupil P of the eyeball E. In other words, an image P' of the pupil P of the eyeball E is formed on the imaging device 3.

As, in such an arrangement, the illumination device attached to the imaging unit 10 is put on, illumination light 4 enters the pupil P of the eyeball E along the optical axis 2. The illumination light 4 incident on the pupil P is subjected to the refraction action of the crystalline lens CL of the eyeball E, concentrating in a minute area around a point of intersection, A, of a line extending from the optical axis 2 with the retina R. In the minute area illuminated by the illumination light 4, scattering of light takes place. The light scattered in the minute area takes an optical path that is substantially opposite to that taken by the illumination light 4, entering the imaging lens 1 along the optical path 2 and yielding an image A' of a scattering area (near to the point of intersection, A, with the retina R) in the vicinity of the rear focal point position of the imaging lens 1. However, the imaging lens 1 is out of focus at this position. For this reason, the light leaving the minute area around the point of intersection, A, with the retina R diverges once concentrating in the vicinity of a point A', and then enters the imaging device 3, forming a bright image P' of the pupil P on the imaging plane.

The bright image P' of the pupil P on the imaging plane of the imaging device 3 is well known as the "red-eye" phenomenon in the photography field; in a picture taken of a figure at night with a strobe flashed, a figure's pupil looks like a round, exceedingly flashing red portion. This "round red-eye" portion is nothing but the image P' of the pupil P. The shape of the round image P' is indicative of the shape of the pupil P, and its brightness and color are indicative of those of the minute area in the retina R. That is, the shape of the round image formed on the imaging plane of the imaging device 3 is perfectly identical to that of the figure's pupil P, and its brightness and color are nothing but those of the minute area in the point of intersection, A, with the retina R. Here, if the minute area in the vicinity of the point of intersection A is called a minute division a on the retina R, then the image P' could be referred to as a pixel P' that carries the brightness and image information of the minute division a on the retina R.

Therefore, if the images of minute divisions a on the retina R are picked up in a continuously varying manner, a group of pixels P' can then be obtained. In turn, it is possible to reconstruct a retinal (fundus) image from that group of pixels P'. It is here understood that the images of the minute divisions a may be concurrently picked up. In either case, the optical axes 2 of adjoining imaging units are differently oriented.

Figure 1:
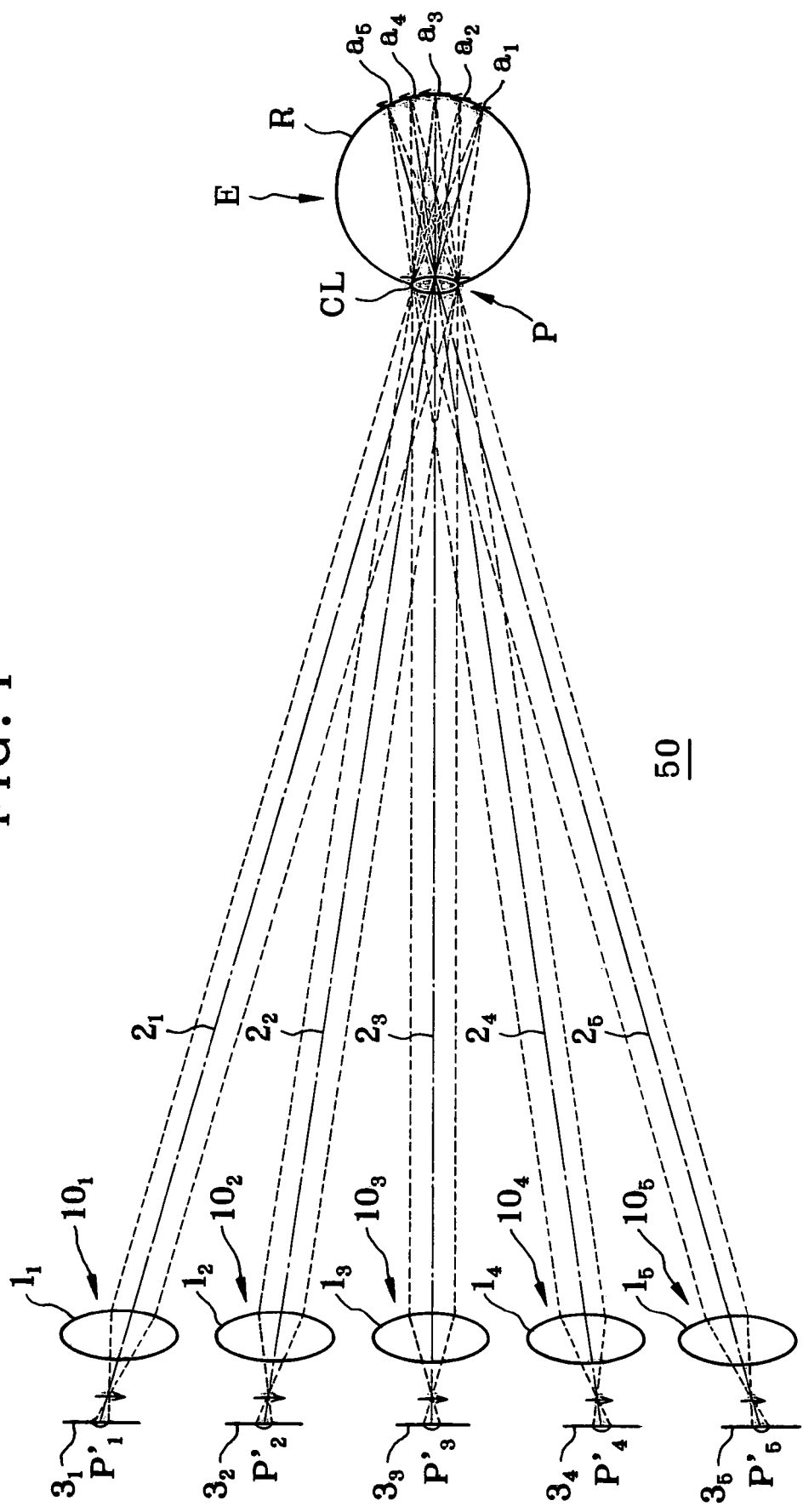
FIG. 1 is illustrative in schematic of the arrangement of one embodiment of the imaging system according to the invention.
Figure 2:
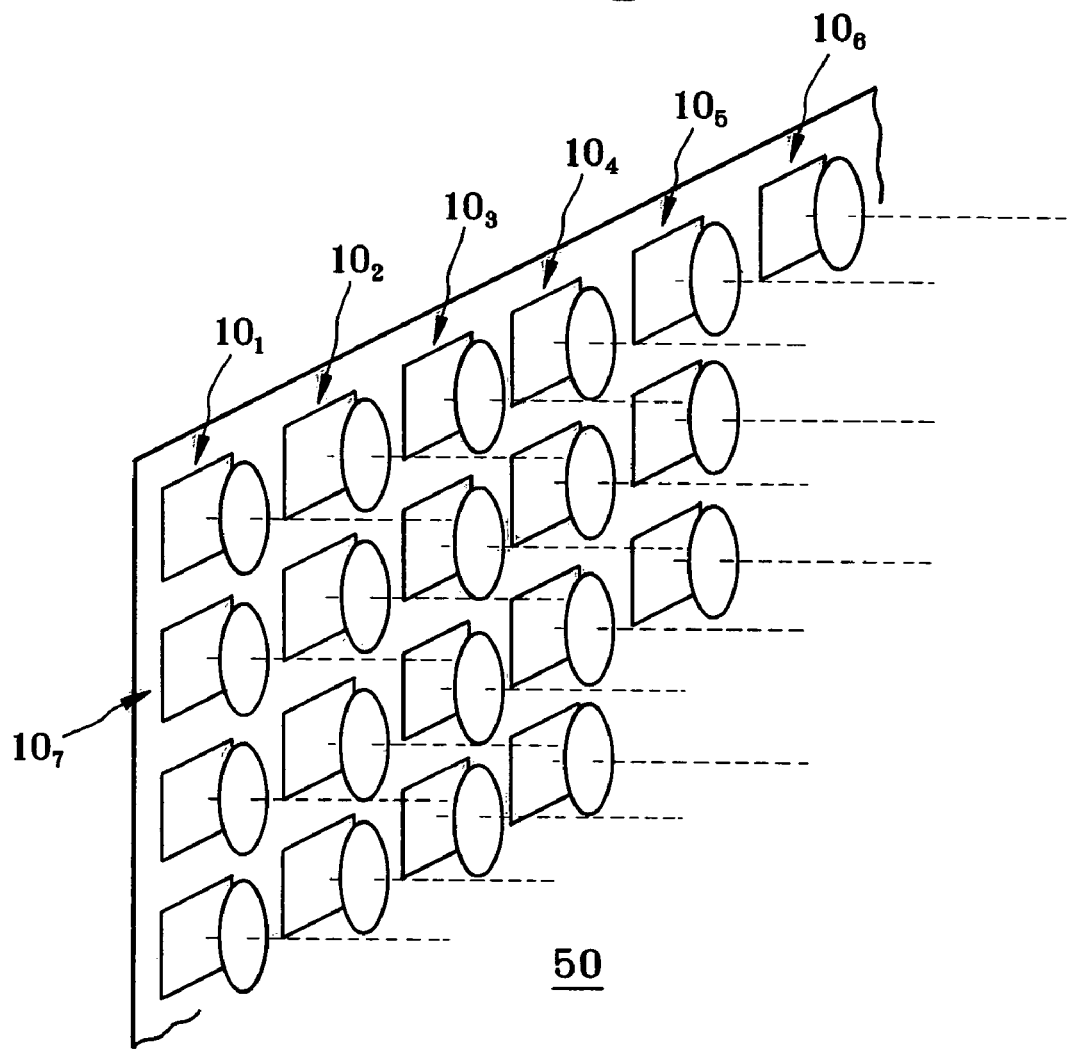
FIG. 2 is a schematic perspective of the imaging system shown in FIG. 1.

FIG. 1 is illustrative in schematic of the construction of an imaging system 50 of the invention for reconstructing such a retinal (fundus) image. The imaging system 50 is built up of a plurality of imaging units $10_n$ where n is an integer, each comprising an imaging lens $1_n$ and an imaging device $3_n$ located on its image plane where n is again an integer. As shown in the perspective view of FIG. 2, the respective imaging units $10_1$, $10_2$, $10_3$ and so on are two-dimensionally arranged in rows and columns. The respective imaging units $10_1$, $10_2$, $10_3$ and so on have much the same construction. Preferably, the imaging lenses $1_1$, $1_2$, $1_3$ and so on should be flush with the imaging devices $3_1$, $3_2$, $3_3$ and so on, and there should be the same two-dimensional pitch among the imaging units $10_1$, $10_2$, $10_3$ and so on arranged as described above. In FIG. 2, the central axes of the imaging lenses $1_1$, $1_2$, $1_3$ and so on are shown by broken lines. As shown in FIG. 2, the imaging units $10_1$, $10_2$, $10_3$ and so on are arranged with those central axes parallel with one another. It is noted, however, that the optical axes $2_1$, $2_2$, $2_3$ and so on of the imaging lenses $1_1$, $1_2$, $1_3$ and so on or the imaging units $10_1$, $10_2$, $10_3$ and so on are defined as straight lines passing the centers of the imaging lenses $1_1$, $1_2$, $1_3$ and so on and the center of the pupil P of the eyeball E. In some cases, therefore, the center axes shown by broken lines are not in alignment with the optical axes $2_1$, $2_2$, $2_3$ and so on.

In such an arrangement, the imaging system 50 is provided with an illumination device. Illumination light is directed to the eyeball E via the imaging units $10_1$, $10_2$, $10_3$ and so on along the optical axes $2_1$, $2_2$, $2_3$ and so on, so that the images of distinct, separate minute divisions $a_1$, $a_2$, $a_3$, etc. on the retina R are formed on the imaging devices $3_1$, $3_2$, $3_3$, etc. in the imaging units $10_1$, $10_2$, $10_3$ and so on. Those images carry the brightness and color information of the minute divisions $a_1$, $a_2$, $a_3$ and so on, and have the same round shape as the pupil P. At this time, pixels $P_1'$, $P_2'$, $P_3'$ and so on are obtained in an arrangement corresponding to the arrangement of the minute divisions $a_1$, $a_2$, $a_3$, etc. on the retina R, as shown in FIGS. 3(a) and 3(b). FIG. 3(a) is similar to FIG. 1. In FIG. 3(b), light from the minute divisions $a_1$, $a_2$, $a_3$, etc. concentrates on the imaging devices $3_1$, $3_2$, $3_3$, etc. in the imaging units $10_1$, $10_2$, $10_3$, etc., and figure's relatively dark images $I_1$, $I_2$, $I_3$ and so on are formed on the imaging devices $3_1$, $3_2$, $3_3$ and so on. Those figure's images $I_1$, $I_2$, $I_3$, etc. include the pixels $P_1'$, $P_2'$, $P_3'$, etc. of the identical round shape, which carry the brightness and color information of the minute divisions $a_1, a_2, a_3$, etc. on the retina R. Then, the bright pixels $P_1', P_2', P_3'$ and so on are cut out of the formed images $I_1, I_2, I_3$ and so on via image processing, and then rearranged (synthesized) in an arrangement corresponding to the imaging units $10_1, 10_2, 10_3$ and so on. If the minute divisions $a_1, a_2, a_3$, etc. on the retina R are combined together in this way, it is then possible to obtain the image of the whole fundus (fundus image).

For the purpose of cutting the images $P_1', P_2', P_3'$, etc. out of the formed images $I_1, I_2, I_3$, etc., image processing may be used. For instance, use may be made of a process wherein images formed without illumination light 4 are subtracted from images formed with irradiation with illumination light 4 (FIG. 4). With such image processing, the images $P_1', P_2', P_3'$, etc. can be readily cut out.

In the foregoing, no account is given of the illumination device for directing the illumination light 4 to the eyeball E. Some examples of the illumination device are now explained.

Figure 5:
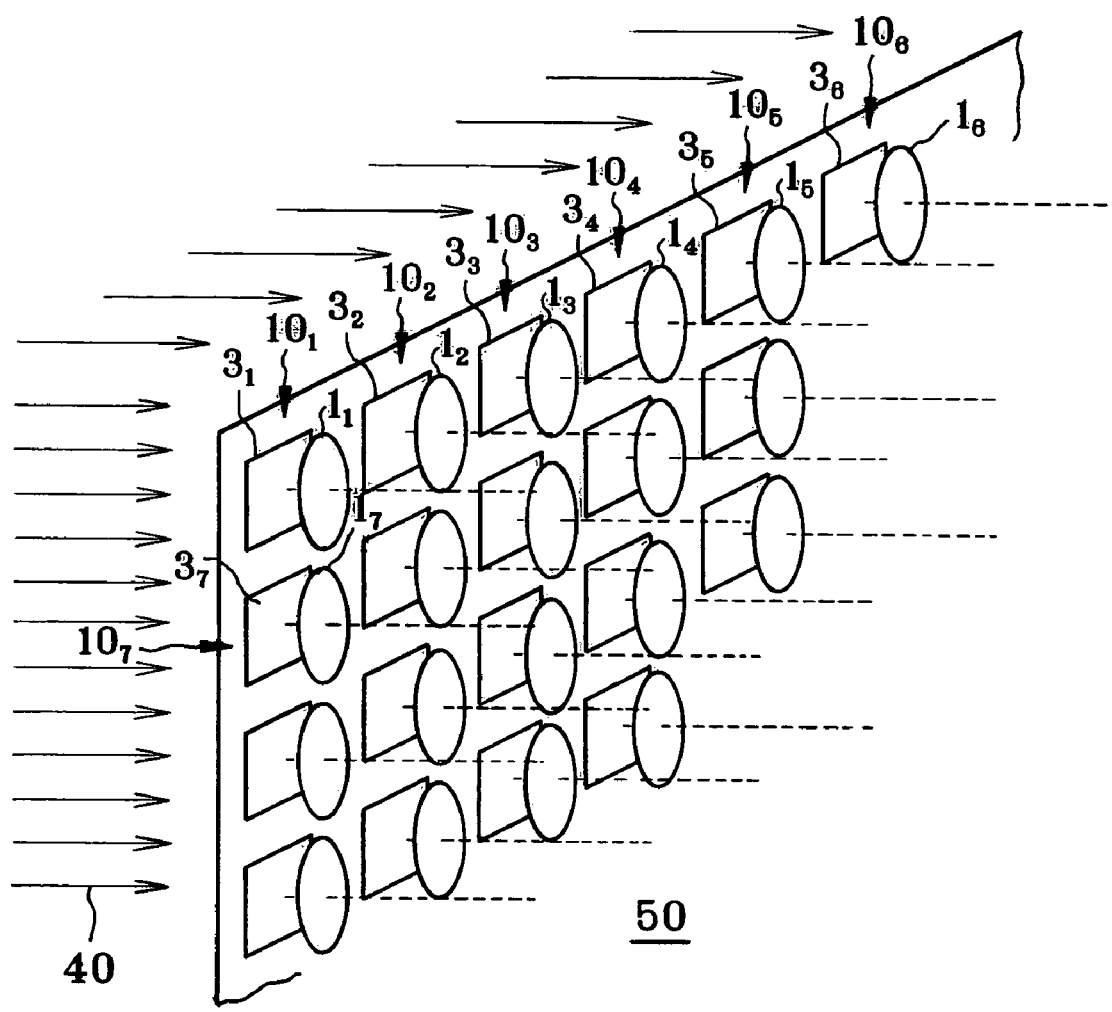
FIG. 5 is illustrative of one embodiment of the illumination device used on the imaging system according to the invention.

FIG. 5 shows the illumination device of the simplest construction. In FIG. 5, an imaging system 50 is built up of a plurality of imaging units $10_1, 10_2, 10_3$ and so on which are two-dimensionally arranged in rows and columns. A surface light source (not shown) or the like is located behind the side of the imaging system 50 (that faces away from the object to be imaged), so that illumination light 40 can pass through the gap between adjoining imaging units $10_1$ and $10_2$ and $10_2$ and $10_3$, etc. (adjoining imaging devices $3_1$ and $3_2$ and $3_2$ and $3_3$, etc. and adjoining imaging lenses $1_1$ and $1_2$ and $1_2$ and $1_3$, etc.). It is thus possible to use the illumination light 40 as the illumination light 4 that is directed to the eyeball E of the object to be imaged. Preferably in this case, the illumination light 40 should have some angle of dispersion. Such light contains much component of illumination light 4 that is directed to the eyeball E to be imaged along the optical axis 2 of each imaging unit 10, so that the minute divisions $a_1, a_2, a_3$, etc. on the retina R can be brightly illuminated.

Figure 6:
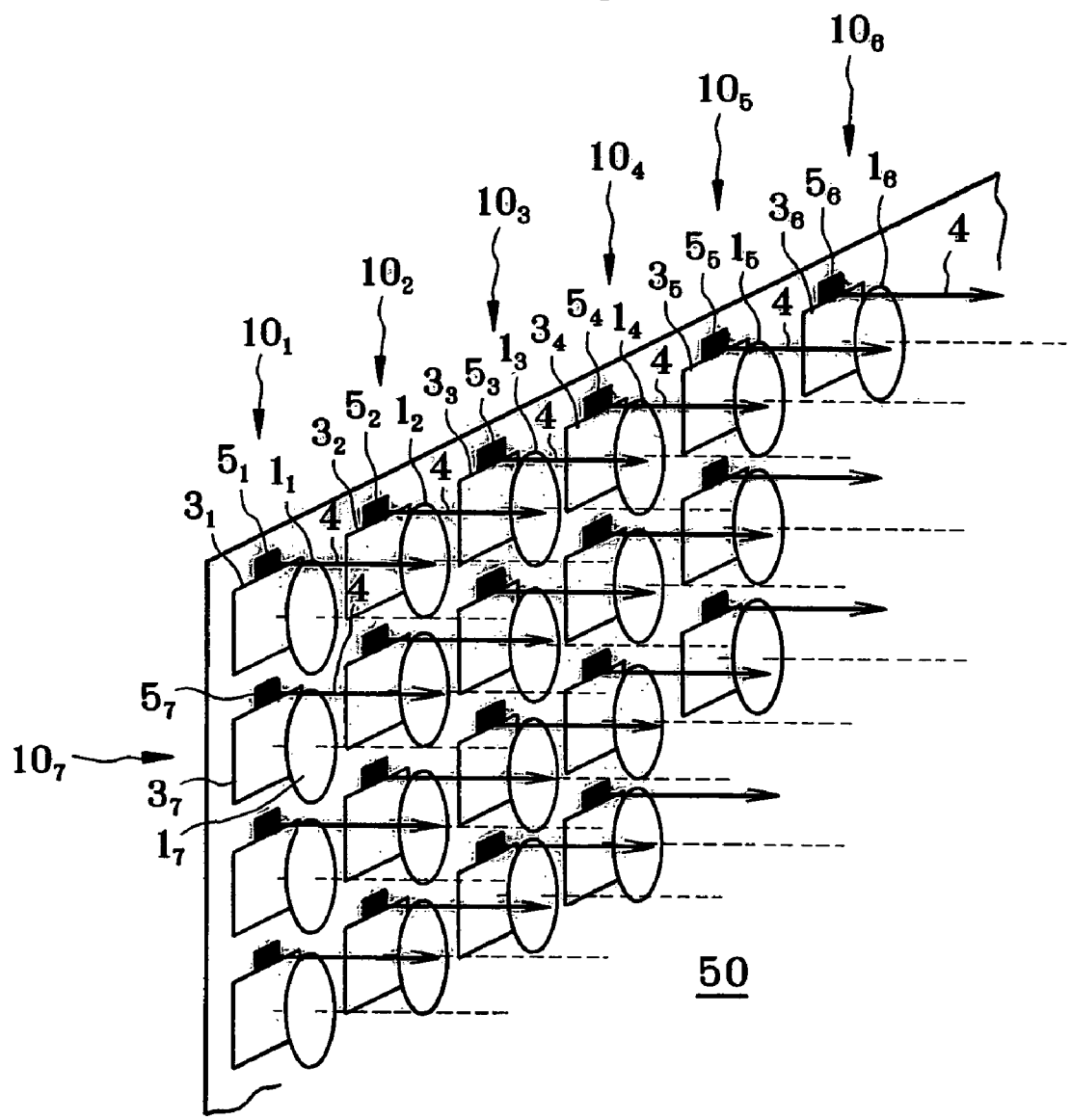
FIG. 6 is illustrative of another embodiment of the illumination device used on the imaging system according to the invention.

Referring next to FIG. 6, each of light sources $5_1, 5_2, 5_3$ and so on is located around each of imaging units $10_1, 10_2, 10_3$ and so on. More specifically, the light sources $5_1, 5_2, 5_3$ and so on are attached to a common plate to which the imaging units $3_1, 3_2, 3_3$ and so on are attached. At this time, the light sources $5_1, 5_2, 5_3$ and so on correspond to the imaging devices $3_1, 3_2, 3_3$ and so on in a one-to-one relation.

Such an arrangement enables illumination light 4 to be directed to the eyeball E of the object to be imaged along the optical axis 2 of each imaging unit.

Preferably in this case, the illumination light 4 should be directed to the eyeball E in a coaxial relation to the optical axis 2 of each imaging unit 10, so that a bright "red-eye" image, i.e., a bright pixel P' can be obtained at each imaging unit 10.

Figure 7:
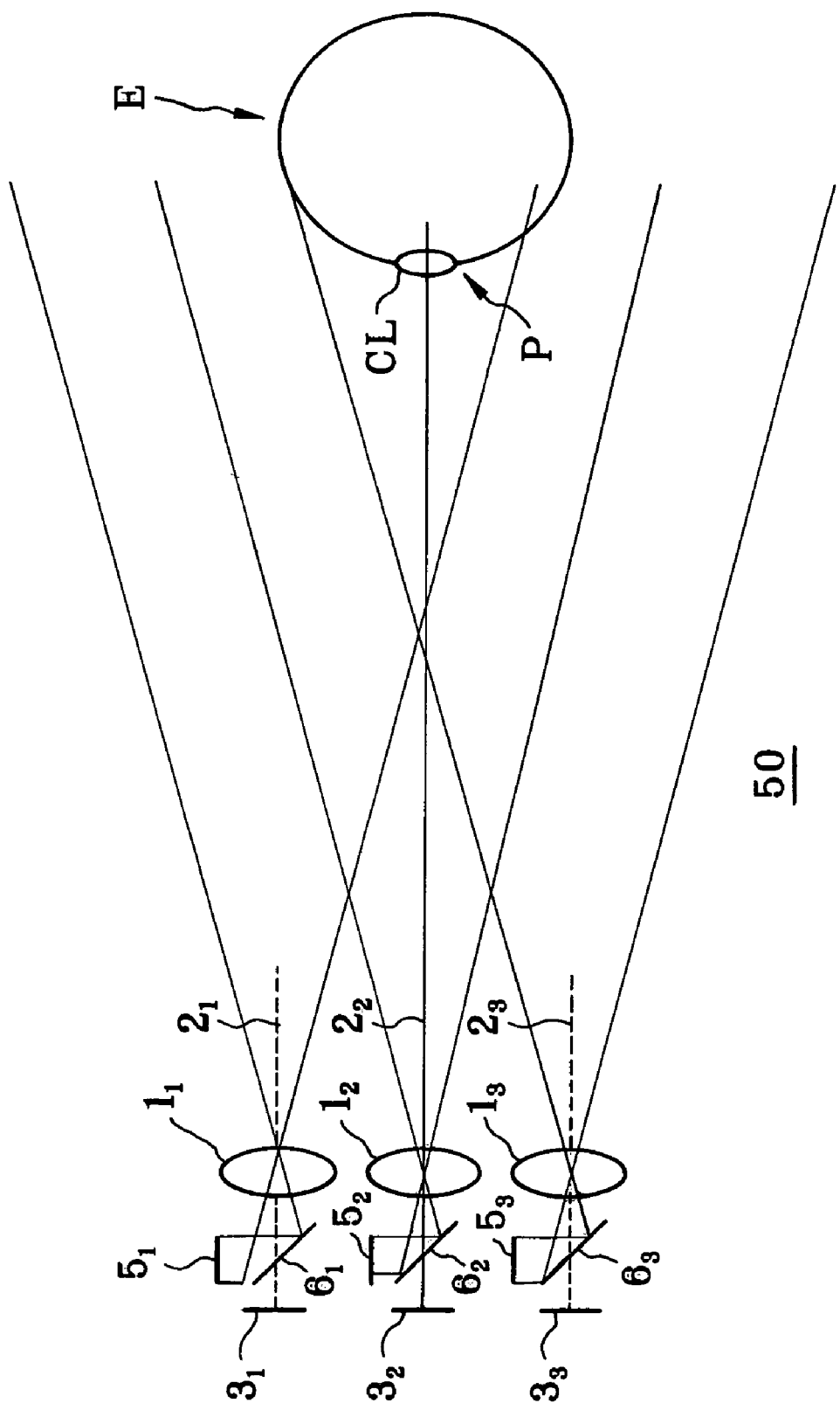
FIG. 7 is illustrative of yet another embodiment of the illumination device used on the imaging system according to the invention.

Referring to FIG. 7, semi-transmitting mirrors $6_1, 6_2, 6_3$ and so on are obliquely located on the respective optical axes $2_1, 2_2, 2_3$ and so on, and light sources $5_1, 5_2, 5_3$ and so on are located on the outside of an imaging optical path that faces those semi-transmitting mirrors $6_1, 6_2, 6_3$ and so on. This allows light from the light sources $5_1, 5_2, 5_3$ and so on to be reflected at the semi-transmitting mirrors $6_1, 6_2, 6_3$ and so on. The reflected light enters the eyeball E of the object to be imaged along the optical axes $2_1, 2_2, 2_3$ and so on. In FIG. 7, the semi-transmitting mirrors $6_1, 6_2, 6_3$ and so on are interposed between imaging lenses $1_1, 1_2, 1_3$, etc. and imaging devices $3_1, 3_2, 3_3$, etc. However, it is acceptable to locate those semi-transmitting mirrors on the object sides of the imaging lenses $1_1, 1_2, 1_3$ and so on.

Preferably in the above arrangement, infrared light should be used as the illumination light. The use of infrared light as the illumination light ensures that the pupil becomes larger upon imaging, so that brighter images can be obtained. When infrared light is used in combination with an infrared transmission filter, it is possible to cut off light other than infrared light, so that images with more reduced noises can be obtained.

Figure 8:
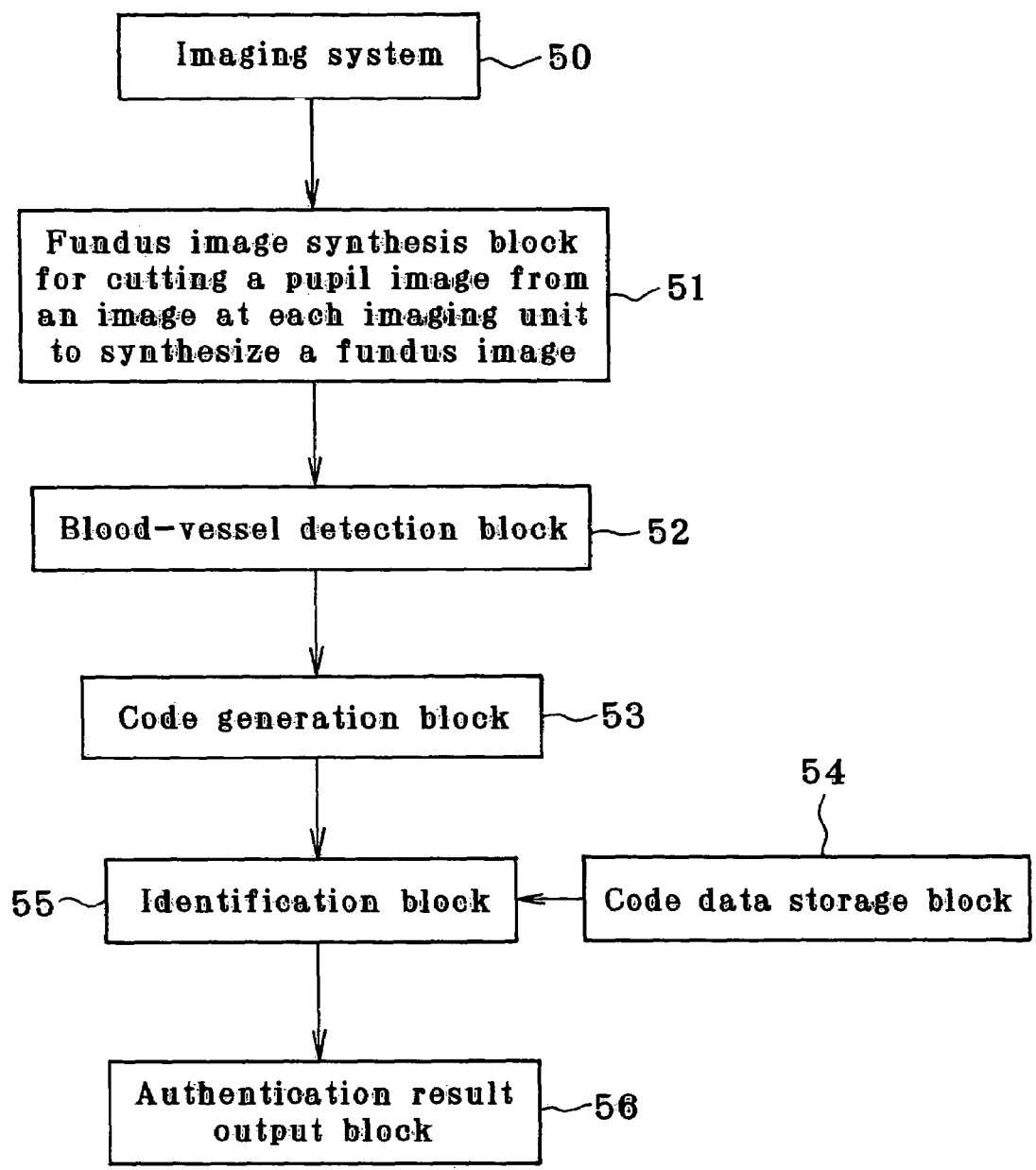
FIG. 8 is illustrative of one embodiment of the personal identification system that incorporates the imaging system of the invention.

In the invention, such an imaging unit 50 as explained with reference to FIGS. 1-3 and FIGS. 5-7 is used to set up a personal identification system. From an image obtained with the imaging system 50, a fundus image is synthesized for identity authentication, as shown typically in FIG. 8.

That is, at the respective imaging units $10_1, 10_2, 10_3$, etc. in such an imaging system 50 as described above, images $I_1, I_2, I_3$, etc. of a particular person are obtained. Then, at a fundus image synthesis block 51, bright images $P_1', P_2', P_3'$, etc. of the pupil are cut out of the thus obtained particular person's images $I_1, I_2, I_3$ and so on by means of image processing wherein, for instance, images obtained with no application of illumination light 4 are subtracted from images obtained with the application of illumination light 4 (FIG. 4). Then, at the fundus image synthesis block 51, the thus cut-out images (pixels) $P_1', P_2', P_3'$, etc. of the pupil are rearranged corresponding to the arrangement of the imaging units $10_1, 10_2, 10_3$, etc. for the synthesis of the fundus image. Then, simple image processing is carried out at a blood-vessel detection block 52 to detect a retinal blood-vessel pattern (blood-vessel image) from the obtained fundus image. Subsequently, at a code generation block 53, the center position of the papilla is detected from the obtained blood-vessel image, as proposed in prior art. Subsequently, the fundus image is concentrically scanned from that center position to detect an angle component at a position where blood vessels are found. With such a process or other processes, the traits of the fundus image are generated in the form of code data. The code data generated at the code generation block 53 is indicative of a person's traits. The code data is entered in a person identification block 55 for comparison with those of persons previously stored in a code storage block 54. If the code data agrees with one of the previously stored code data, that person is authenticated, and if not, the person is rejected. The results of authentication are produced in an authentication result output block 56 connected to the person identification block 55.

Figure 9:
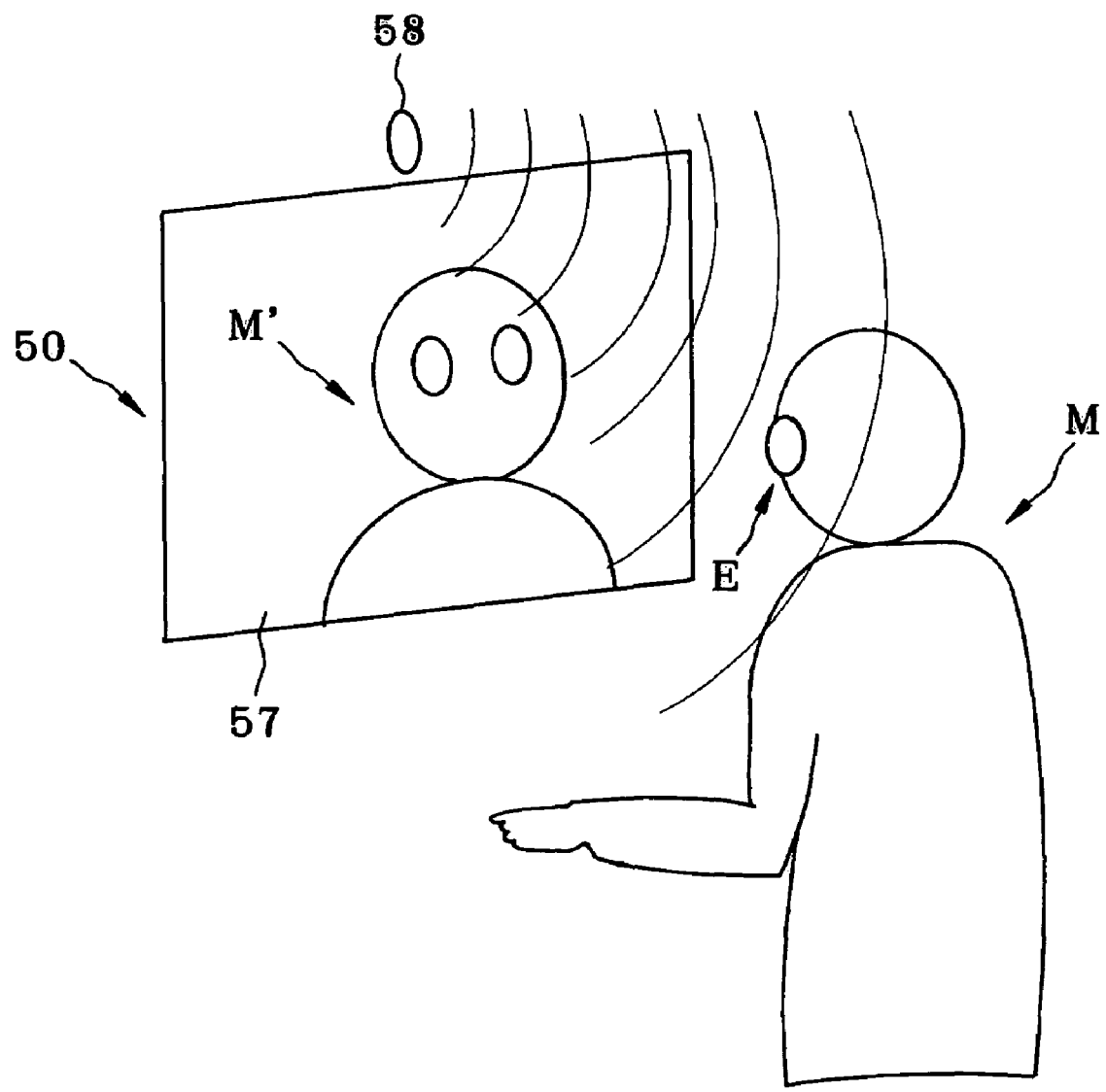
FIG. 9 is illustrative in schematic of how the inventive imaging system with a built-in subject range finder mechanism is used.

For the inventive imaging system 50 shown in FIGS. 1 and 4, it is required to form the images $P_1', P_2', P_3'$, etc. of the pupil definitely in an in-focus manner. To this end, the person that is the subject and the imaging system 50 must be kept apart from each other at a constant distance. It is thus desired that, as shown typically in the schematic view of FIG. 9, a subject range finder mechanism be built in the system. More specifically, a range finder device 58 such as an ultrasonic sensor is mounted on an upper portion of an imaging system 50. As, in this state, the person M to be authenticated stands in front of the imaging system 50, the range finder device 58 is actuated. Then, upon the found subject range reaching a constant value, images are picked up at the respective imaging units $10_1, 10_2, 10_3$, etc. in the imaging system 50 in response to signals from the range finder device 58, so that images $I_1, I_2, I_3$ and so on are obtainable. In the embodiment of FIG. 9, it is understood that a semi-transmitting mirror 57 is located in front of the imaging system 50 to reflect the image M' of the person M therein.

Figure 10:
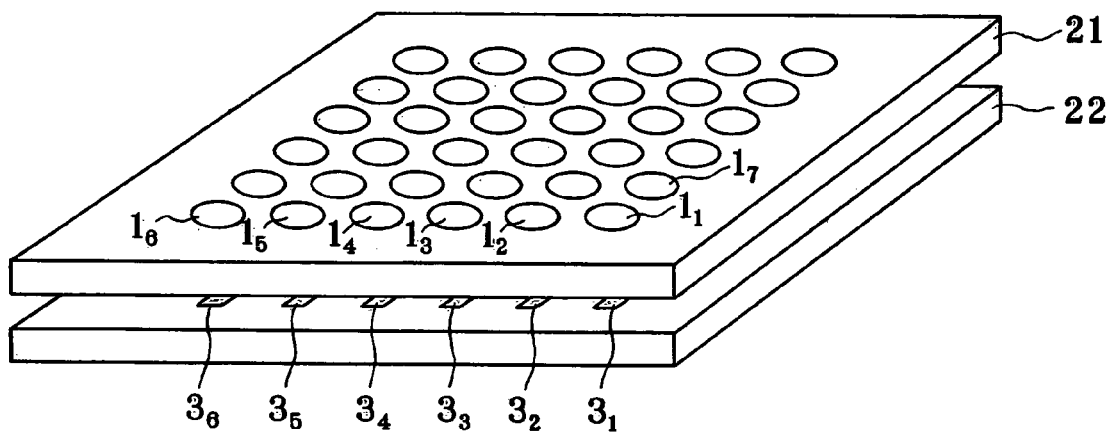
FIG. 10 is a schematic perspective view of the construction of another embodiment of the imaging system according to the invention.

As explained in conjunction with FIGS. 1 and 2, a plurality of imaging units $10_1, 10_2, 10$ and so on are two-dimensionally arranged in rows and columns. It is then desired that imaging lenses $1_1, 1_2, 1_3$, etc. in the respective imaging units $10_1, 10_2, 10_3$, etc. be flush with imaging devices $3_1, 3_2, 3_3$, etc. therein. That is, as shown in FIG. 10, the respective imaging lenses $1_1$, $1_2$, $1_3$ and so on are set up in the form of a microlens array 21, so that they can be arranged on a single substrate in a two-dimensional array, integral row-and-column form. The imaging devices $3_1$, $3_2$, $3_3$ and so on, too, may be made up as an imaging device array 22, so that they may be arranged on a single substrate in a two-dimensional array, integral row-and-column form. Then, the microlens array 21 and the imaging device array 22 are positioned apart from each other by an image-formation distance. In this way, it is possible to simply construct the inventive imaging system 50 wherein a plurality of imaging units 50 are two-dimensionally arranged in rows and columns.

Figure 11:
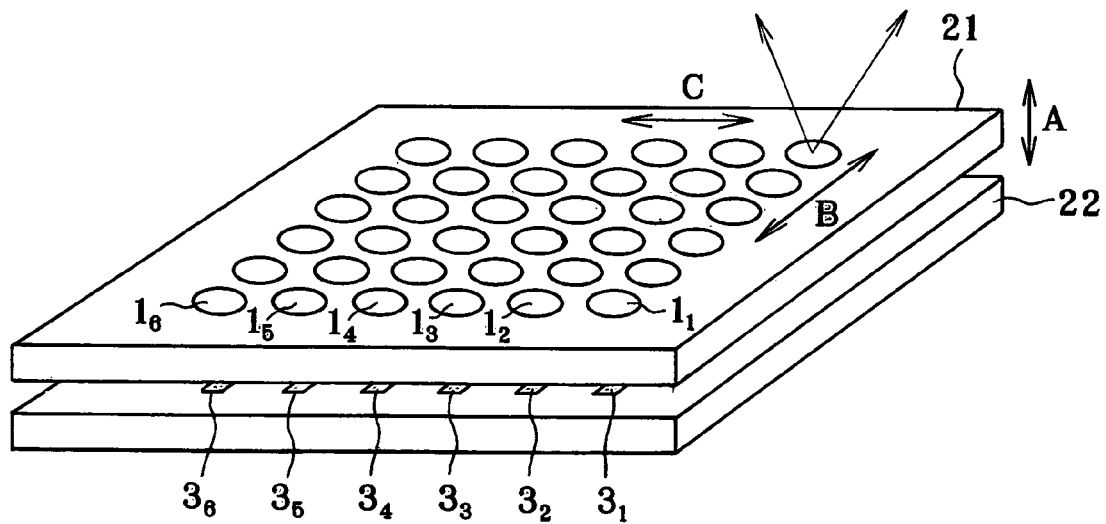
FIG. 11 is illustrative in schematic of the embodiment of FIG. 10 wherein focus adjustment and field adjustment are feasible.
Figure 12:
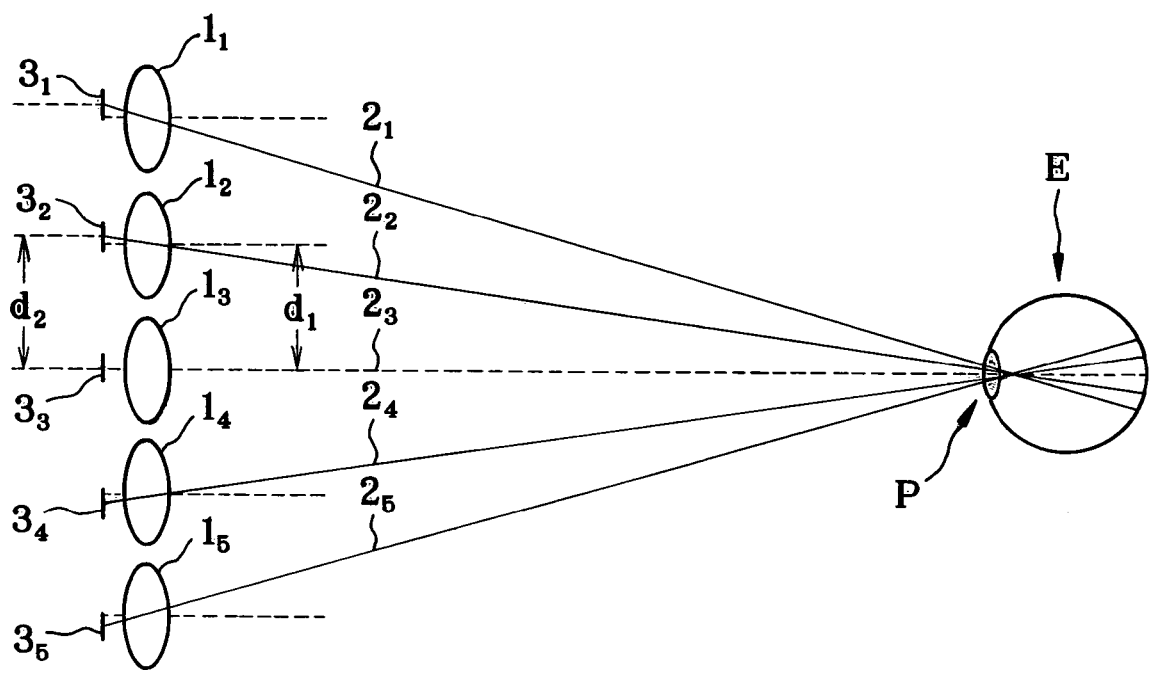
FIG. 12 is illustrative in schematic of the construction of the imaging system according to the invention, wherein the spacing between adjoining imaging devices is wider than that between adjoining imaging lenses.

Thus, when the imaging system 50 is constructed using the microlens array 21 and imaging device array 22, it is preferable that, as shown in FIG. 11, the spacing between both is adjustable in a direction indicated by a double-headed arrow A, because focus adjustment can be made at the same time. Consequently, the subject range remains adjustable to a certain degree rather than remains fixed. In the plane of the microlens array 21, the microlens array 21 may also be adjustable with respect to the imaging device array 22 in a direction C orthogonal to a double-headed arrow B. This ensures that the imageable field position in each of the imaging units $10_1$, $10_2$, $10_3$ and so on is adjustable.

In the imaging system 50 of the invention, the optical axes $2_1$, $2_2$, $2_3$, etc. of the respective imaging units $10_1$, $10_2$, $10_3$, etc. are arranged in such a way as to cross the eyeball E of an individual that is the subject at the pupil P, as shown in FIG. 1. Assume here that the spacing between the adjoining imaging lenses $1_1$ and $1_2$, $1_2$ and $1_3$, etc. is the same as that between the adjoining imaging devices $3_1$ and $3_2$, $3_2$ and $3_3$, etc. Then, the optical axes 2 of the imaging units 10 at a peripheral area in particular (for instance, the imaging units $10_1$, $10_6$ in FIG. 1) are not in alignment with the center axes of the imaging lenses 1. In other words, image pickups will take place in an off-axis or decentered state, resulting possibly in the image of the subject being formed on the outside of the range of the imaging devices 3. In this case, the image P' of the pupil P is not centrally positioned at the imaging devices 3. To foreclose that possibility, the imaging devices $3_1$, $3_2$, $3_3$, etc. are arranged such that the spacing $d_2$ between the adjoining devices $3_1$ and $3_2$, $3_2$ and $3_3$, etc. is larger than the spacing $d_1$ between the adjoining lenses $1_1$ and $1_2$, $1_2$ and $1_3$, etc. This ensures that even at any imaging units $10_1$, $10_2$, $10_3$ and so on, the image P' of the pupil P of the eyeball E is formed at the centers of the imaging devices $3_1$, $3_2$, $3_3$ and so on.

Figure 13:
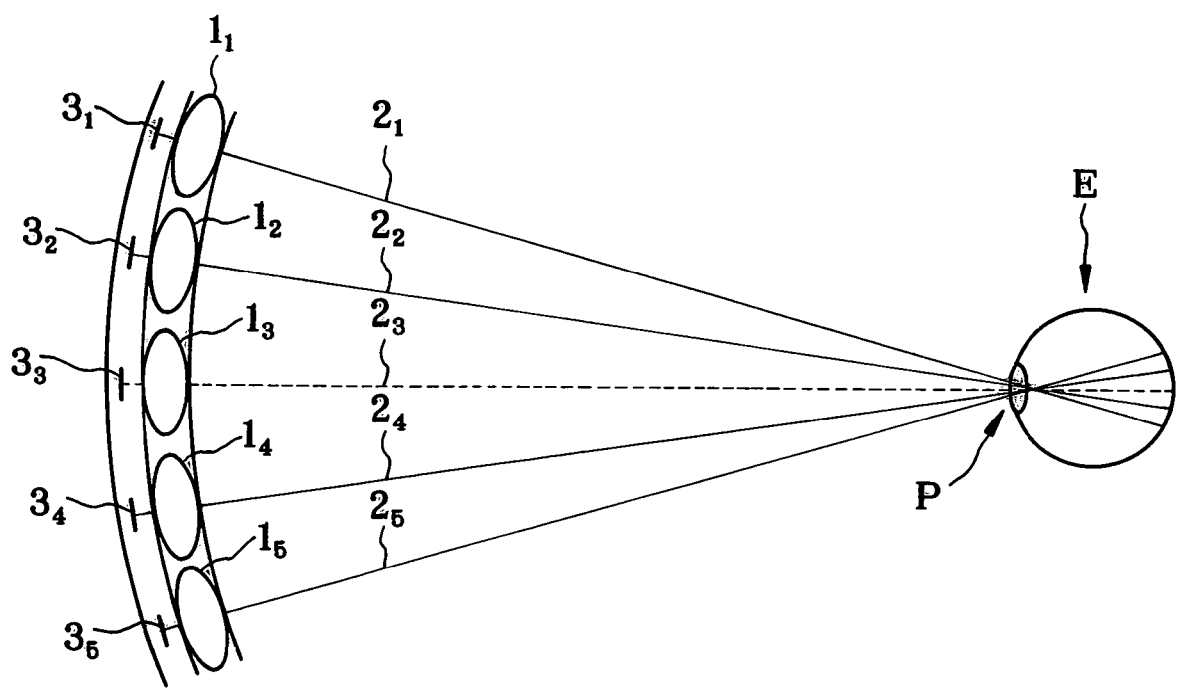
FIG. 13 is illustrative in schematic of an embodiment of the invention, wherein the imaging lenses and imaging devices are arranged on a concentric spherical surface (three-dimension) or a concentric cylindrical surface (two-dimension).

In any of the above embodiments, the imaging lenses $1_1$, $1_2$, $1_3$ and so on are kept flush with the imaging devices $3_1$, $3_2$, $3_3$ and so on. This arrangement, however, often causes the optical axes 2 of the imaging units 10 at a peripheral area in particular (for instance, the imaging units $10_1$ and $10_6$ in FIG. 1) to be in misalignment with the center axes of the imaging lenses 1. For this reason, the imaging lenses 1 must have been corrected for aberrations over a range wider than the necessary angle of view. Consequently, there is no choice but to use complicated, costly lenses as the imaging lenses 1. In addition, when wide-angle lenses are used as the imaging lenses 1, it is impossible to use lenses having a long focal length, ending up with an increase in the size that can be resolved with the imaging devices 3. To avoid this, the imaging lenses $1_1$, $1_2$, $1_3$ and so on and the imaging devices $3_1$, $3_2$, $3_3$ and so on are arranged on a concentric spherical surface (three-dimension) or a concentric cylindrical surface (two-dimension) with the pupil P of the eyeball E as the center, as shown in FIG. 13. This ensures that at all the imaging units $10_1$, $10_2$, $10_3$ and so on, the optical axes $2_1$, $2_2$, $2_3$, etc. thereof are in alignment with the center axes of the imaging lenses $1_1$, $1_2$, $1_3$ and so on, so that the above problem can be solved.

Figure 14A:
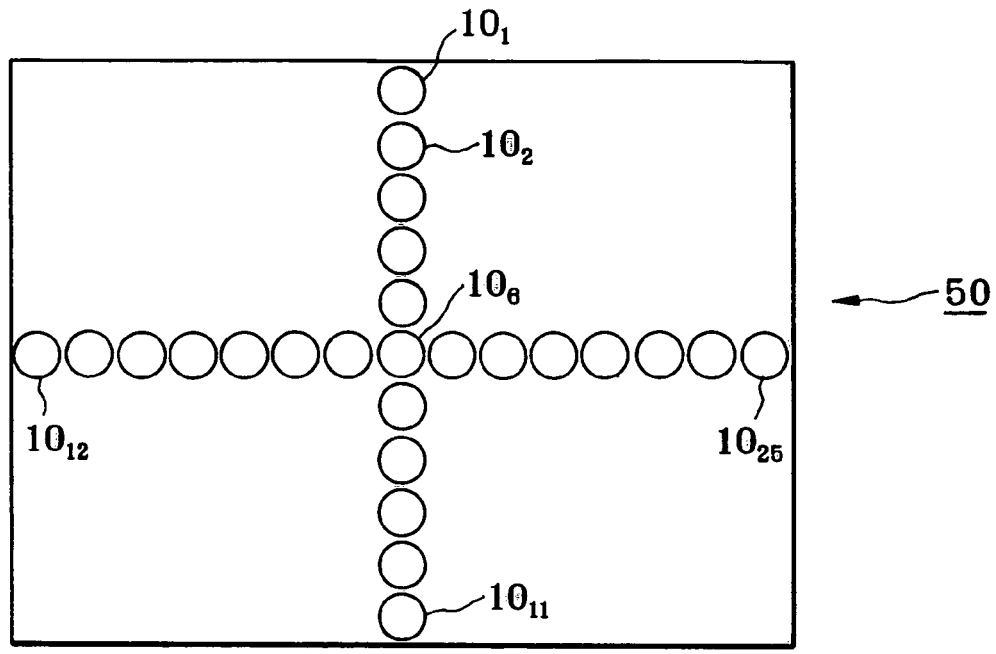
FIGS. 14(a) and 14(b) are illustrative of modifications to the imaging system of the invention, wherein the imaging units are arranged in pattern forms.
Figure 14B:
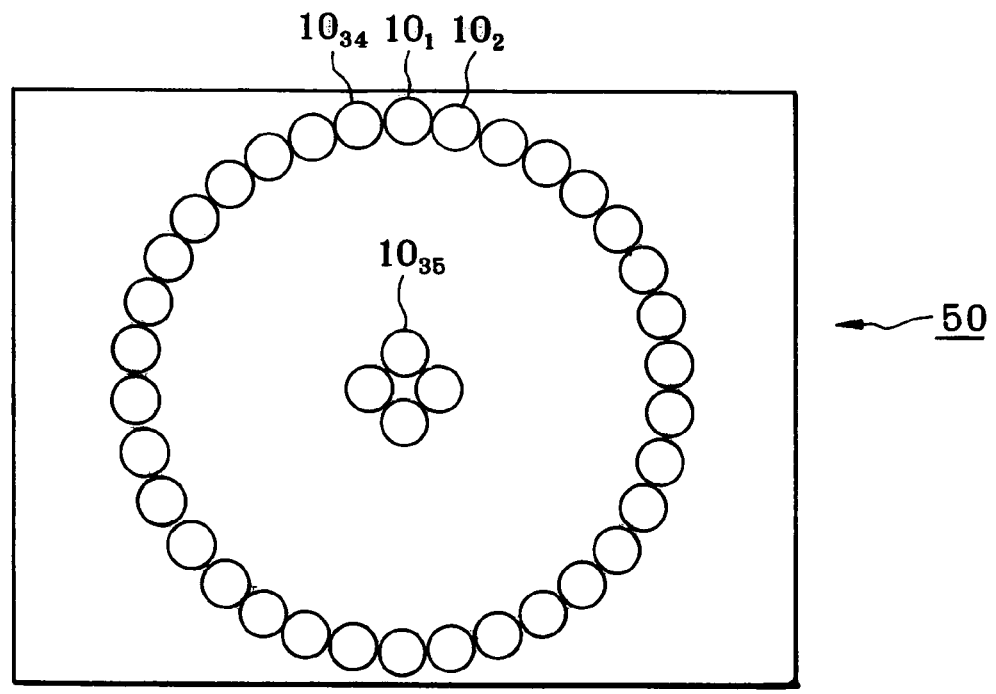
Figure 15:
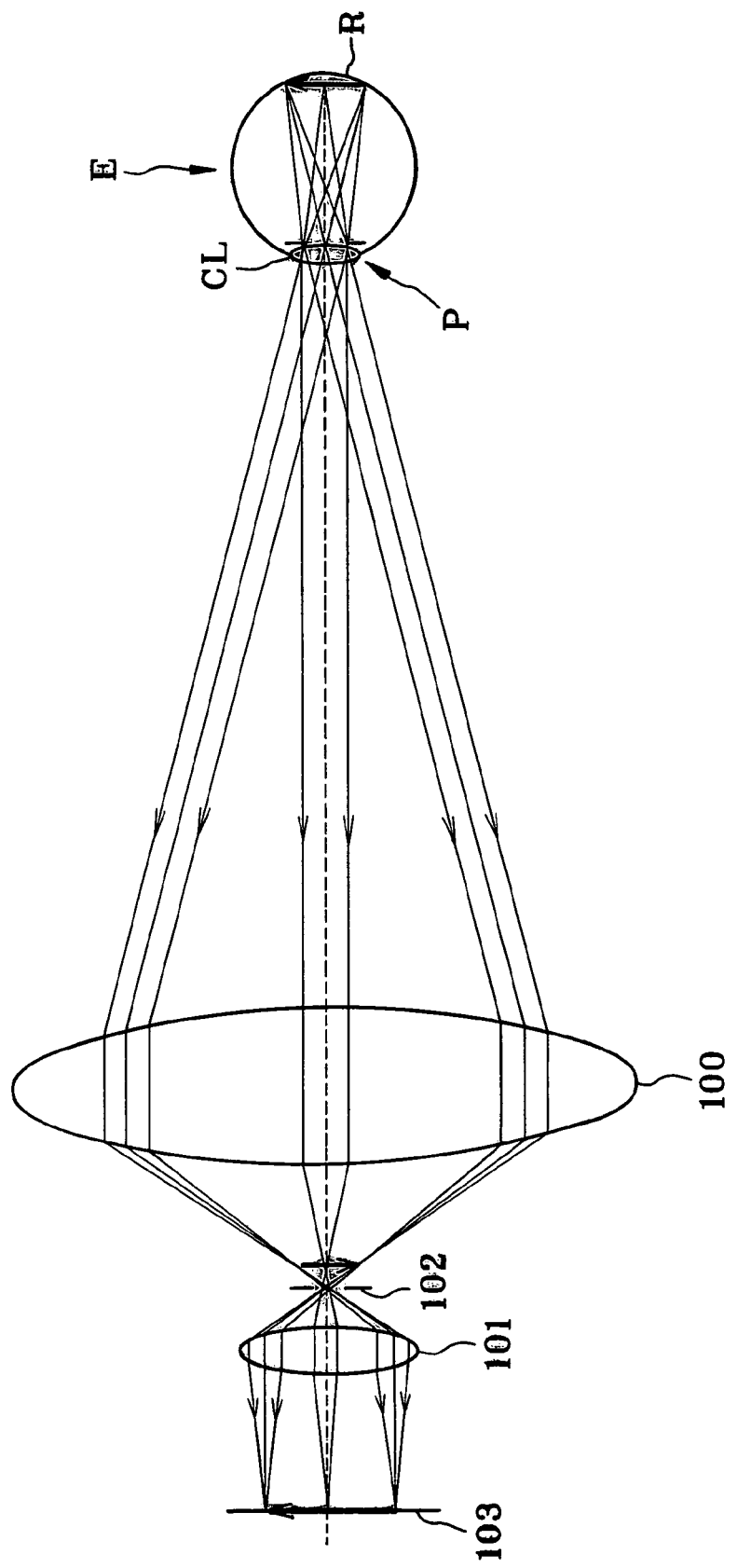
FIG. 15 is illustrative of the construction of an optical system in a prior art system for picking up a fundus image using a fundus camera.

In the imaging system 50 of the invention, it is understood that the imaging units $10_1$, $10_2$, $10_3$ and so on are not necessarily arranged in a row-and-column, two-dimensionally packed fashion, as shown typically in FIG. 2. For a system aiming at identifying individual differences from fundus images for authentication, only the crosswise, two-dimensional arrangement of the imaging units may be needed, as shown in FIG. 14(a). Alternatively, a two-dimensional arrangement is acceptable, which comprises imaging-units located at a center area to detect the center position of the papilla and imaging units located at a concentric peripheral area to detect an angle component at positions of radially extending blood vessels. Still alternatively, the imaging units may be located in other two-dimensional patterns.

While how many imaging units $10_1$, $10_2$, $10_3$, etc. are used for the imaging system 50 has not been described, it is understood that it is preferable to use as many imaging units as possible, as viewed two-dimensionally. For practical reasons, however, at least about 100×100 imaging units 10 should be arranged in rows and columns.

While the imaging system of the invention and the identity authentication system incorporating the same have been described with reference to the principles and some embodiments, it is understood that the invention is by no means limited to those embodiments, and many other modifications may be feasible.

(1) An imaging system, characterized by comprising a plurality of imaging units, each of which comprises an imaging lens and an imaging device located on the image plane thereof, and which are two-dimensionally arranged in rows and columns, and an illumination device for illuminating a subject in a direction along the optical axis of each imaging unit, wherein said optical axis of each imaging unit is defined by an axis that passes through a common object point at an imaging position and a center of each imaging lens.

(2) The imaging system according to (1) above, characterized in that said illumination device is located at a position where a subject is illuminated from the periphery of said imaging device or said imaging lens in said each imaging unit.

(3) The imaging system according to (2) above, characterized in that said illumination device comprises a common light source located behind said imaging device in said each imaging unit.

(4) The imaging system according to (2) above, characterized in that said illumination device comprises a light source located for each imaging unit.

(5) The imaging system according to (1) above, characterized in that said illumination device is located at a position where illumination light is directed coaxially with respect to the optical axe of said each imaging unit.

(6) The imaging system according to any one of (1) to (5) above, characterized in that said plurality of imaging lenses are constructed as a lens array wherein lenses are integrally mounted in a mutual row-and-column arrangement.

(7) The imaging system according to (6) above, characterized in that said lens array is located at a position integrally adjustable in the normal direction to the plane thereof.

(8) The imaging system according to (6) or (7) above, characterized in that said lens array is located at a position integrally adjustable in two orthogonal directions in a plane thereof.

(9) The imaging system according to any one of (1) to (8) above, characterized in that in the imaging device in said imaging unit is located with its center substantially in alignment with the optical axis thereof.

(10) The imaging system according to any one of (1) to (9) above, characterized in that said imaging lenses and said imaging devices are located such that the spacing between imaging lenses in adjoining imaging units is larger than that between imaging devices in adjoining imaging units.

(11) The imaging system according to any one of (1) to (10) above, characterized in that the imaging lenses and imaging devices belonging to said plurality of imaging units are arranged in an at least one direction and on a concavely curved surface with respect to said common object point.

(12) An identity authentication system, characterized by comprising an imaging system as recited in any one of (1) to (11) above, wherein said each imaging unit simultaneously picks up images inclusive of an image of a pupil of an individual for authentication, which is located at an object point position, a fundus image synthesis block wherein the image of the pupil of the individual for authentication is cut out of each of the images picked up by said imaging system, and the thus cut-out images of the pupil are used as pixels to rearrange said pixels corresponding to an arrangement of said imaging units, thereby synthesizing a fundus image, a data generation block that extracts, from the thus synthesized fundus image, data indicative of traits thereof, and an identification block that compares the thus extracted data with separately stored data.

In accordance with the imaging system of the invention and the identity authentication system incorporating the same, a plurality of imaging units, each of which comprises an imaging lens and an imaging device located in the image plane thereof, are two-dimensionally arranged in rows and columns, and an illumination device for illuminating a subject in a direction along the optical axis of each imaging unit are provided, wherein the optical axis of each imaging unit is defined by an axis that passes through a common object point at an imaging position and the center of each imaging lens, as can be appreciated from the foregoing. Thus, the present invention can provide a slim imaging system that can synthesize the desired fundus image at low cost without recourse to any large-size pupil relay optical system. With this imaging system, the trait data of the fundus image necessary for authentication can be easily extracted with no need of particularly strict alignment of the head of the individual to be authenticated with respect to that imaging system.

What is claimed is:

1. An imaging system, comprising:
    a plurality of imaging units, and
    an illumination device, wherein:
    each of said plurality of imaging units comprises an imaging lens and an imaging device located on an image plane of said imaging lens,
    said plurality of imaging units are two-dimensionally arranged in rows and columns,
    with an optical axis of each imaging unit defined as an axis through a common object point at an imaging position and the center of each imaging lens, directions of the optical axes of the imaging units adjacent to each other are different,
    said common object point and each imaging device are located at a conjugate position, and
    said illumination device is positioned in such a way as to direct illumination light in a direction along the optical axis of each imaging unit.

2. The imaging system according to claim 1, wherein said illumination device is located at a position where a subject is illuminated from a periphery of said imaging device or said imaging lens.

3. The imaging system according to claim 1, wherein said illumination device comprises a common light source located behind said imaging devices.

4. The imaging system according to claim 1, wherein said illumination device comprises a plurality of illumination light sources, wherein said plurality of illumination light sources are each located with respect to each of said plurality of imaging units.

5. The imaging system according to claim 1, wherein said illumination device is located at a position where illumination light is directed coaxially with respect to the optical axes of said imaging units.

6. The imaging system according to claim 1, wherein said plurality of imaging lenses are a lens array with integrally formed lenses.

7. The imaging system according to claim 6, wherein said lens array is located at a position adjustable in a normal direction to a plane thereof.

8. The imaging system according to claim 6, wherein said lens array is located at a position adjustable in two orthogonal directions in a plane thereof.

9. The imaging system according to claim 1, wherein each of said imaging units is located with a center substantially in alignment with an optical axis thereof.

10. The imaging system according to claim 1, wherein in each of said plurality of imaging units, said imaging lens and said imaging device are located such that in adjoining imaging units, a spacing between said imaging lenses is larger than that between said imaging devices.

11. The imaging system according to claim 1, wherein each of said imaging lenses and each of said imaging devices are arranged in an at least one direction and on a concavely curved surface with respect to said common object point.

12. An identity authentication system, comprising:
    an imaging system as recited in claim 1,
    a fundus image synthesis block,
    a data generation block, and
    an identification block, wherein:
    in said imaging system, said each imaging unit simultaneously picks up images inclusive of an image of a pupil of an individual to be authenticated, which is located at an object point position,
    said fundus image synthesis block comprises a step of cutting the image of the pupil of the individual to be authenticated out of each of the images picked up by said imaging system, and a step of using cut-out images of the pupil as pixels to rearrange said pixels corresponding to an arrangement of said imaging units for synthesis of a fundus image,
    said data generation block extracts, from a synthesized fundus image, data indicative of traits thereof, and
    said identification block compares extracted data with separately stored data.

13. The imaging system according to claim 1, wherein said imaging lenses are each the same.

14. The imaging system according to claim 1, wherein the optical axis of said each imaging unit is substantially in alignment with the optical axis of said each imaging lens.

* * * * *